United States Patent
Bernitsas

(10) Patent No.: US 10,627,534 B2
(45) Date of Patent: Apr. 21, 2020

(54) RECONNAISSANCE MARINE SEISMIC SURVEYS HAVING REDUCED DENSITY OF SAIL LINES

(71) Applicant: ION Geophysical Corporation, Houston, TX (US)

(72) Inventor: Nikolaos Bernitsas, Sugarland, TX (US)

(73) Assignee: ION Geophysical Corporation, Houston, TX (US)

( * ) Notice: Subject to any disclaimer, the term of this patent is extended or adjusted under 35 U.S.C. 154(b) by 251 days.

(21) Appl. No.: 15/475,465

(22) Filed: Mar. 31, 2017

(65) Prior Publication Data

US 2017/0285197 A1    Oct. 5, 2017

Related U.S. Application Data

(60) Provisional application No. 62/316,168, filed on Mar. 31, 2016.

(51) Int. Cl.
*G01V 1/38* (2006.01)

(52) U.S. Cl.
CPC .... *G01V 1/3808* (2013.01); *G01V 2210/1293* (2013.01); *G01V 2210/1423* (2013.01); *G01V 2210/169* (2013.01)

(58) Field of Classification Search
CPC ......... G01V 1/3808; G01V 2210/1293; G01V 2210/1423; G01V 2210/169
See application file for complete search history.

(56) References Cited

U.S. PATENT DOCUMENTS

| | | | |
|---|---|---|---|
| 7,391,673 B2* | 6/2008 | Regone | G01V 1/3808 367/16 |
| 8,705,317 B2* | 4/2014 | Houck | G01V 1/301 367/73 |
| 8,724,429 B2* | 5/2014 | Houck | G01V 1/308 367/73 |
| 9,261,619 B2* | 2/2016 | Mandroux | G01V 1/3808 |
| 9,581,712 B2* | 2/2017 | Brookes | G01V 1/18 |
| 9,746,570 B2* | 8/2017 | Mensch | G01V 1/3817 |
| 2016/0131785 A1* | 5/2016 | Tonchia | G01V 1/3808 367/15 |
| 2017/0017005 A1* | 1/2017 | Siliqi | G01V 1/3808 |
| 2017/0363760 A1* | 12/2017 | Mensch | G01V 1/3808 |

FOREIGN PATENT DOCUMENTS

| | | |
|---|---|---|
| WO | WO2014195505 A2 | 12/2014 |
| WO | WO2015011247 A1 | 1/2015 |
| WO | 2015175766 A1 | 11/2015 |

OTHER PUBLICATIONS

International Search Report for International Application No. PCT/US2017/025299 dated Jun. 20, 2017, from the European Patent Office.

* cited by examiner

*Primary Examiner* — Krystine E Breier
(74) *Attorney, Agent, or Firm* — Holland & Hart, LLP

(57) ABSTRACT

Methods, systems, and apparatuses are disclosed for conducting reconnaissance marine seismic surveys. In one example method of acquiring a marine seismic survey, a plurality of streamers are towed behind an acquisition vessel, the plurality of streamers defining a swath. A source is towed behind the acquisition vessel, and at least one other source is towed outside of the swath of streamers.

25 Claims, 8 Drawing Sheets

RECONNAISSANCE MARINE SEISMIC SURVEYS HAVING REDUCED DENSITY OF SAIL LINES

CROSS REFERENCES

This application claims priority to U.S. provisional patent application No. 62/316,168, titled "Reconnaissance Marine Seismic Surveys Having Reduced Density of Sail Lines," filed Mar. 31, 2016, the entirety of which is hereby incorporated by reference for all purposes.

BACKGROUND

The present invention relates to seismic acquisition in general and, in particular, to methods and systems for conducting reconnaissance marine seismic surveys.

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other wave exploration techniques to find oil and gas reservoirs within the Earth. These seismic exploration techniques often include controlling the emission of seismic energy into the Earth with a seismic source of energy (e.g., dynamite, air guns, vibrators, etc.), and monitoring the Earth's response to the seismic source with one or more receivers in order to create an image of the subsurface of the Earth.

Conventional marine seismic surveys generally involve towing one or more streamer cables with a plurality of receivers behind an acquisition vessel. Each receiver includes, for example, a pressure sensor and/or a particle motion sensor in proximity to one another. The pressure sensor may be, for example, a hydrophone that records scalar pressure measurements of a seismic wavefield. The particle motion sensor may be, for example, a three-component geophone that records vectorial velocity measurements of the seismic wavefield. By observing the reflected seismic wavefield detected by the receiver(s) during the survey, the geophysical data pertaining to reflected signals may be acquired and these signals may be used to form an image indicating the composition of the Earth near the survey location.

It can be very expensive to acquire and process the data collected in towed-streamer marine seismic surveys. The acquisition can be expensive because of the large amount of equipment and coordination required to plan and carry out a towed-streamer survey. Conventional 3D towed-streamer acquisition geometries typically include 5-15 streamers towed, together with one or more sources, behind an acquisition vessel, with the streamers spaced at 50-100 meters and towed at a depth of about 10 meters. The vessels usually tow the streamers in a "racetrack" geometry, with swaths defined by the streamers overlapping by 50% or more in successive acquisition lines. In many cases, the reason for such large overlap is because of the relatively sparse coverage in the near offset range (i.e., for the receivers closest to the vessel and source) that needs to be infilled in subsequent acquisition lines.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Features generally relating to one or more improved systems, methods, and/or apparatuses for conducting marine reconnaissance seismic surveys are described. In FIGS. 1A to 5, various acquisition geometries are described for acquiring relatively sparse seismic data in a first, so-called reconnaissance seismic survey. A reconnaissance seismic survey may be an initial exploration survey acquired at a relatively lower cost and/or in a relatively faster manner (as compared with traditional narrow or wide azimuth seismic surveys). As described in FIGS. 1A to 5, the data from one or more of these reconnaissance seismic surveys may be used to target further, more detailed seismic surveys, and the data from the initial, reconnaissance survey may optionally be combined with the data from a second, more detailed survey to process the seismic data in forming, for example, a subsurface image. However, in other embodiments, data from a reconnaissance survey may be used alone and independent of data from any other surveys.

Various embodiments described herein may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1A:
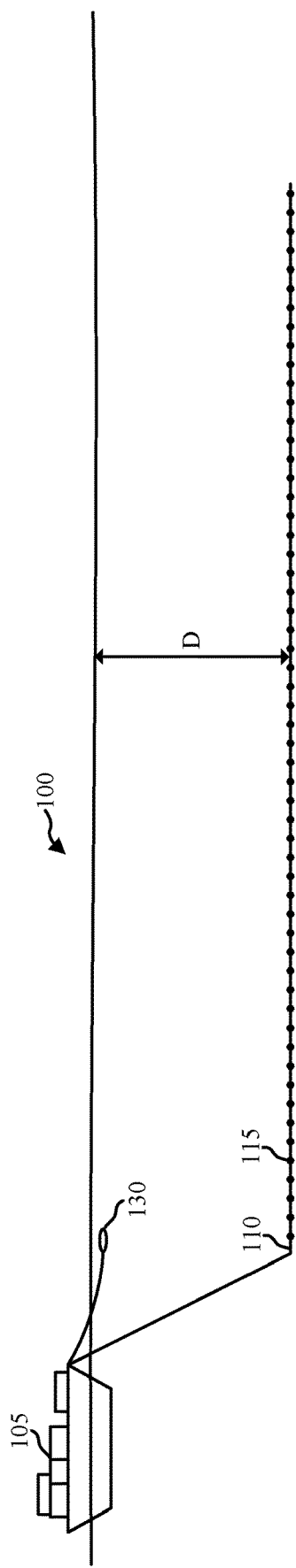
FIGS. 1A, 1B, 1C, and 1D are simplified diagrams of a reconnaissance marine seismic survey system, in accordance with various embodiments.

Referring first to FIG. 1A, a basic example of a marine seismic acquisition system 100 suitable for reconnaissance seismic surveys is shown. System 100 includes an acquisition vessel 105 towing a plurality of streamers 110. Each of the streamers 110 includes a plurality of receivers 115, and each of the receivers 115 includes one or more sensors, such as a pressure sensor or a particle motion sensor. As shown in FIG. 1A, the streamers 110 may be towed at a depth D. In some examples, depth D may be deeper than in conventional towed streamer surveys. For example, the streamers 110 may be towed at a depth of 20-30 meters. In some embodiments, the streamers 110 may be variable depth or slanted streamers, with the receivers 115 on a single streamer being towed at a plurality of different depths.

System 100 also includes one or more sources 130 that are towed with the streamers 110. FIG. 1A illustrates the sources 130 being towed by the acquisition vessel 105. In other examples, however, an independent source vessel may tow the sources 130. In either instance, the sources 130 may be towed such that the sources 130 are generally in front of or near the front of the streamers 110. In other alternatives, the sources 130 may be towed so as to be above the streamers 110. In this manner, at different points during the survey, the sources 130 may be positioned directly over various receivers 115 of the streamers 110, thus allowing for zero-offset and near-offset measurements to be made corresponding to the sources 130. It will be appreciated that, in this alternative arrangement, the streamers 110 are generally towed at a depth D that operationally allows for the sources 130 to be towed above the streamers 110 without tangling or causing other overlapping problems. However, the sources 130 need not be towed above the streamers 110, and may be positioned either over the streamers 110 or at the same level as the streamers 110.

Figure 1B:
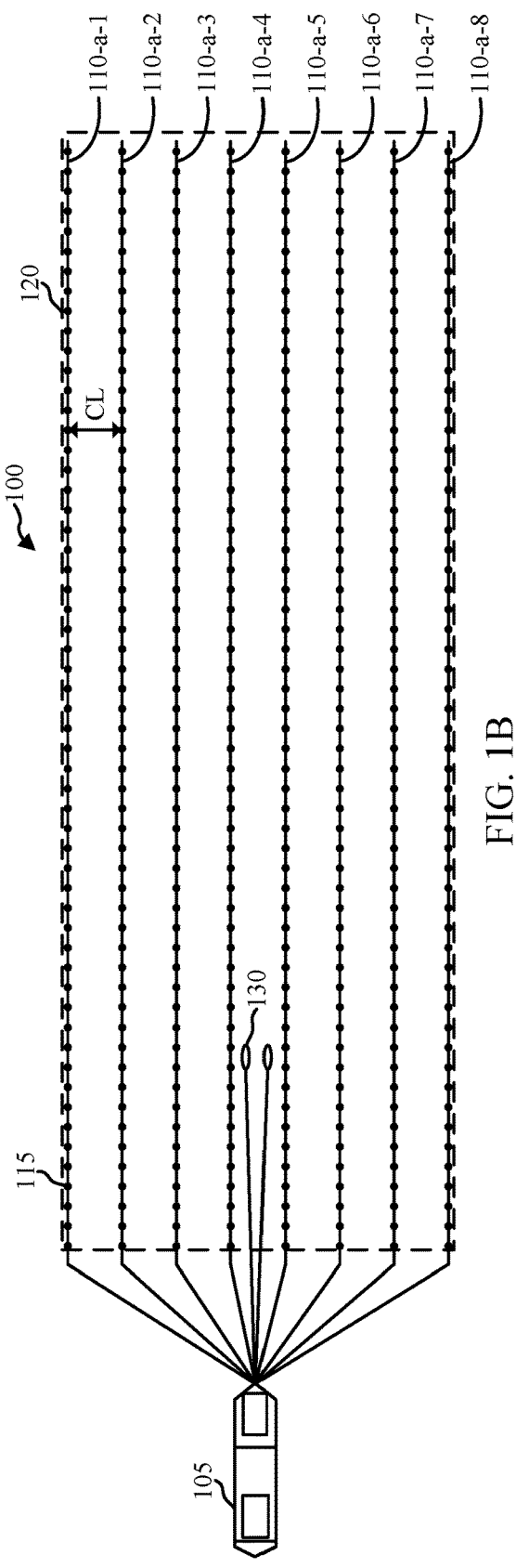

FIG. 1B illustrates a top-down view of system 100 of FIG. 1A. Thus, FIG. 1B illustrates the acquisition vessel 105 towing the plurality of streamers 110. Each of the streamers 110 includes a plurality of receivers 115, and each of the receivers 115 includes one or more sensors, such as a pressure sensor or a particle motion sensor. The streamers 110-*a*-1, 110-*a*-2, 110-*a*-3, 110-*a*-4, 110-*a*-5, 110-*a*-6, 110-*a*-7, 110-*a*-8 are spaced apart from each other via a crossline offset spacing CL. The crossline offset spacing CL may have an effect on the sparsity of data collected by the receivers 115. A larger crossline offset spacing CL may result in a sparser data set, while a smaller crossline offset spacing CL may result in a less sparse data set. Other factors, however, may also contribute to the sparsity of a collected data set and may partially or completely mitigate the crossline offset spacing CL. In one example, a crossline offset spacing CL of 150 meters may be used. In other examples, a more traditional narrow crossline offset spacing CL may be used. Also, while eight streamers 110-*a*-1, 110-*a*-2, 110-*a*-3, 110-*a*-4, 110-*a*-5, 110-*a*-6, 110*a*-7, 110*a*-8 are shown in FIG. 1B, this is merely illustrative, and more or fewer streamers may be towed by the acquisition vessel 105.

Still referring to FIG. 1B, the plurality of streamers 110*a*-1, 110*a*-2, 110*a*-3, 110*a*-4, 110*a*-5, 110*a*-6, 110*a*-7, 110*a*-8 may define a swath 120, which is the overall width of the streamers 110*a*-1, 110*a*-2, 110*a*-3, 110*a*-4, 110*a*-5, 110*a*-6, 110*a*-7, 110*a*-8. More specifically, the swath 120 may be defined in some embodiments as the width between the leftmost and rightmost receiver 115 on the streamers 110*a*-1, 110*a*-2, 110*a*-3, 110*a*-4, 110*a*-5, 110*a*-6, 110*a*-7, 110*a*-8 when towed over a given subsurface region. It is generally understood that the mid-point coverage (e.g., the Common MidPoint (CMP) bins in the subsurface region) of the streamers 110 in the presence of additional sources may be wider or narrower than the swath 120 (e.g., the width of the set of streamers 110).

FIG. 1B illustrates one or more sources 130. In FIG. 1B, the one or more sources 130 are towed by the acquisition vessel 105. While two sources 130 are illustrated in FIG. 1B, the number of sources 130 towed by the acquisition vessel 105 may be one, or may be more than two. The towed sources 130 may be independent of each other, meaning that the sources 130 may not be electronically synchronized. On the other hand, the sources 130 may be synchronized with each other in some form. Towing multiple independent sources 130 over the streamers 110 may provide several different advantages. For example, the multiple sources 130 may provide a greater diversity of CMP coverage data because of the greater number of source-receiver pairs available. Multiple sources 130 may also allow one of the sources to be taken temporarily out of service (e.g., if the source 130 is malfunctioning or needs service) while the other sources 130 continue to operate. In some embodiments, the sail lines or lines of the remaining sources 130 may need to be adjusted to account for the source 130 that was taken out of service. It will be appreciated that by allowing additional sources 130 to continue to operate even after one source 130 is taken out of service may improve the overall availability of the system 100 to continue to acquire seismic data—because, for example, if only a single source was used and that single source is taken offline, the acquisition may need to be stopped until the single source returns to service. Nonetheless, in some instances, only a single source 130 may be used.

Figure 1C:
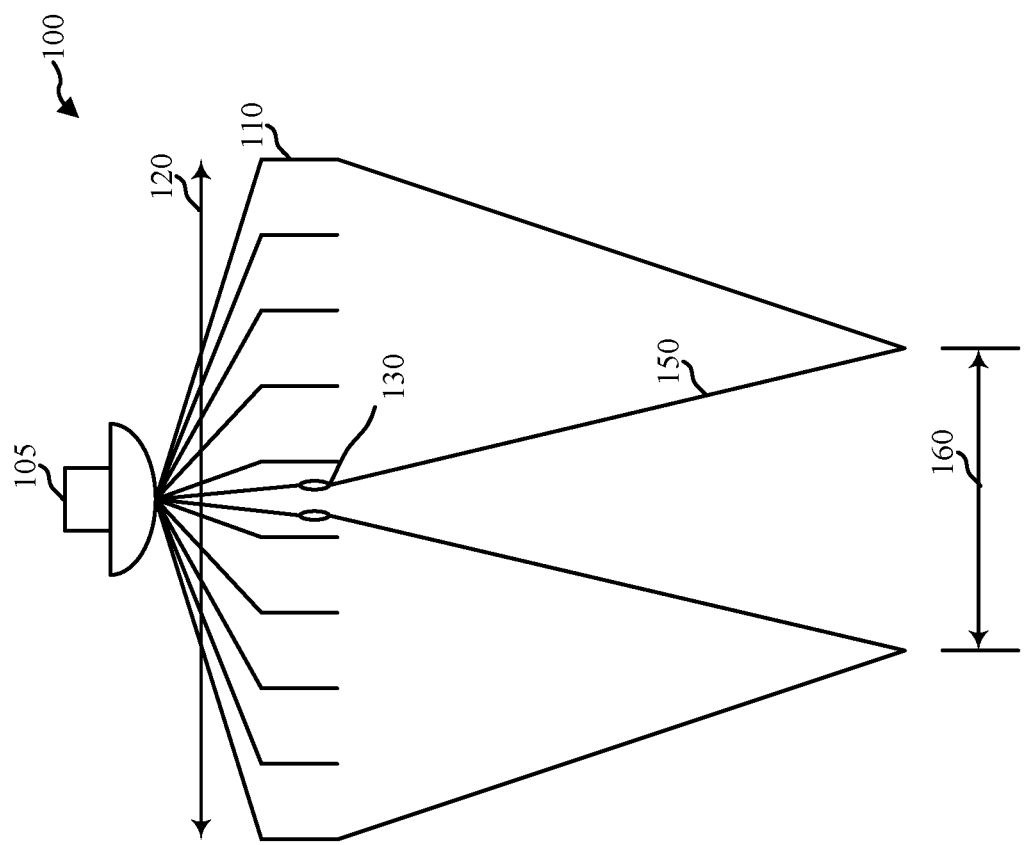

FIG. 1C illustrates a view of system 100 taken from behind the acquisition vessel 105. FIG. 1C allows for an illustration of the coverage area that may be provided by use of the acquisition vessel 105, streamers 110, and sources 130. Acquisition vessel 105 is illustrated at the top of the figure (e.g., at the water's surface). Towing behind the acquisition vessel 105 and at or beneath the water's surface are streamers 110 and sources 130. The distance between a leftmost streamer 110 and the rightmost streamer 110 defines the swath 120 of streamers 110. In some examples, and as illustrated in FIG. 1C, the swath 120 may be defined by ten streamers 110. In other examples, fewer or more streamers 110 may be used. In some examples, the total width of the swath 120 may be approximately 1620 meters. In this example, each streamer 110 in FIG. 1C would be separated from its neighbor streamer 110 by a distance of approximately 180 meters. Other swath and streamer spacing may also be applied to result in either a wider or narrower swath 120 or a swath 120 with fewer or more streamers 110.

The receivers 115 on the streamers 110 are designed to sense seismic energy output by the sources 130 and reflected off of interfaces in the region below the swath 120. FIG. 1C illustrates example paths 150 that may be taken by energy output by the sources 130. The output energy may travel in a variety of directions. However, only certain energy paths may result in the receivers 115 of streamers 110 actually receiving reflected energy. In FIG. 1C, a conventional coverage area 160 is illustrated. The conventional coverage area 160 represents that region underneath the swath 120 wherein energy reflections will result in energy being directed back to the receivers 115 of the streamers 110. Energy from sources 130 that is directed to some area within conventional coverage area 160 will likely be directed back to one or more streamers 110. Energy from sources 130 that is directed to areas outside of conventional coverage area 160 may or may not be sensed by the receivers 115 of streamers 110, but will likely not be sensed in the absence of large subsurface structural complexity.

As is illustrated in FIG. 1C, the conventional coverage area 160 is smaller in width than the width of swath 120. For example, in instances where swath 120 may have a width of approximately 1620 meters, the conventional coverage area 160 may have a width of only 900 meters. The width of the conventional coverage area 160 may vary based on other factors, however the width of conventional coverage area 160 is limited to be smaller than the width of the swath 120.

This means that an acquisition vessel 105 towing a swath 120 of streamers 110 may need to traverse an area using a high density of sail lines in order to cover all of the regions intended to be surveyed. As an example, the acquisition vessel 105 may travel along a first sail line in a first direction, towing a swath 120 of streamers 110 behind the acquisition vessel 105. However, because only a small portion (for example, a central region) of the subsurface underneath the swath 120 is actually covered while the acquisition vessel 105 proceeds along the first sail line, the acquisition vessel 105 will, on its next sail line, travel relatively close to its first sail line. The regions covered by the swaths 120 of the acquisition vessel 105 (during travel along each sail line) will overlap. The efficiency of the survey acquisition process is reduced because of this need for overlap.

Figure 1D:
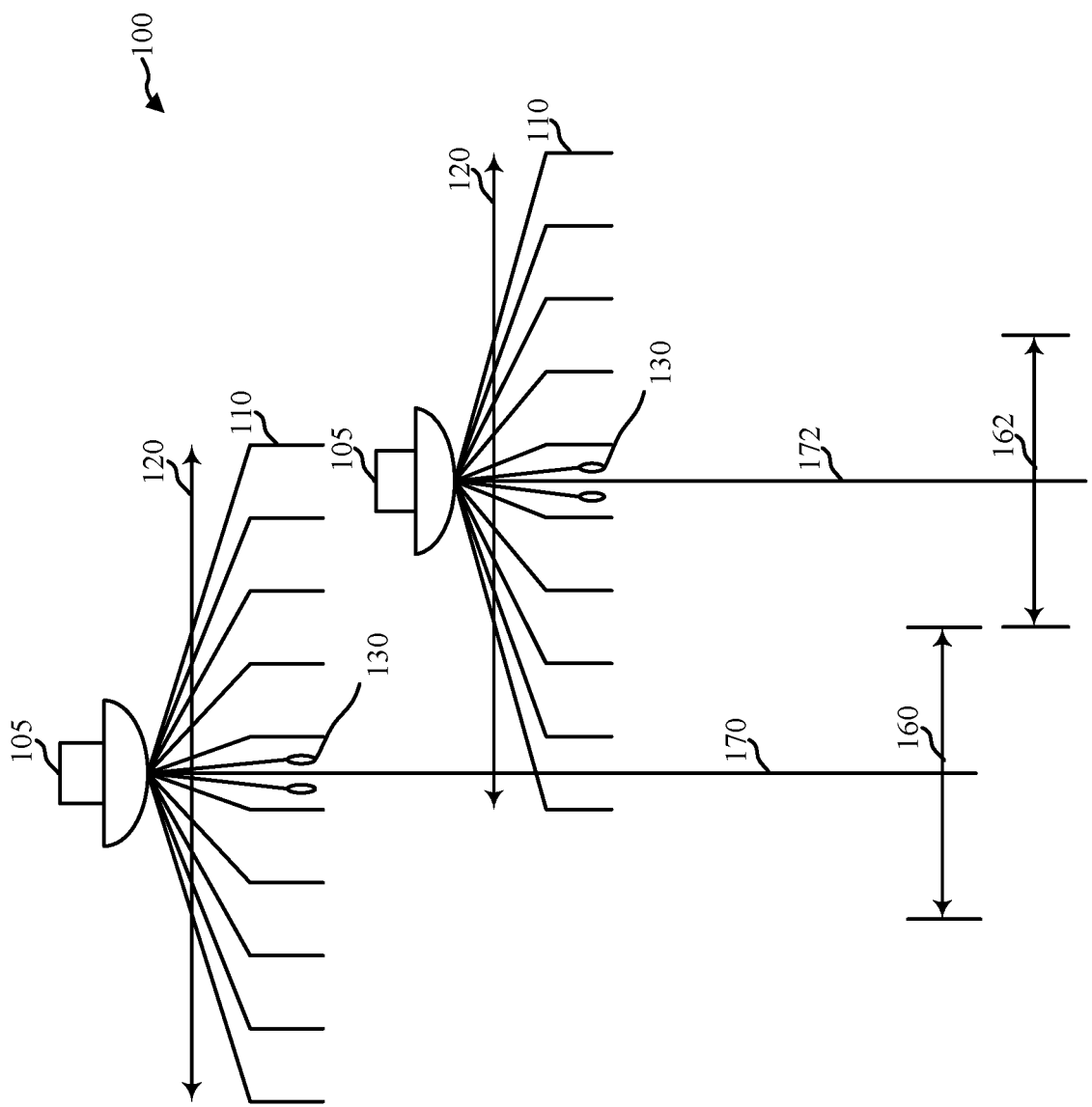

FIG. 1D illustrates an example of two sail lines with reduced efficiency acquisition methods. In FIG. 1D, acquisition vessel 105 tows behind it streamers 110 and sources 130 along a first sail line 170. The first sail line 170 results in conventional coverage area 160. A second sail line 172 is also illustrated with the acquisition vessel 105 towing streamers 110 and sources 130 so as to result in a conventional coverage area 162. In order to have full coverage, meaning that the conventional coverage areas 160, 162 are adjacent each other, the first sail line 170 and the second sail line 172 are close to each other, with overlapping swaths 120.

The efficiency of conducting marine seismic surveys may be improved by using additional independent source vessels operating outside of and along the sides of the swath 120 of streamers 110. By using additional independent source vessels to provide seismic energy from outside of the swath 120, regions that are outside of the conventional coverage area 160, 162 may be covered. While the coverage within these regions outside of the conventional coverage area 160, 162 may be more sparse than the coverage within the conventional coverage areas 160, 162, the coverage may still be sufficient to extend the coverage area per swath 120 or sail line 170 to be at least as wide as the swath 120, and, in many cases, even wider than the width of the swath 120.

Figure 2A:
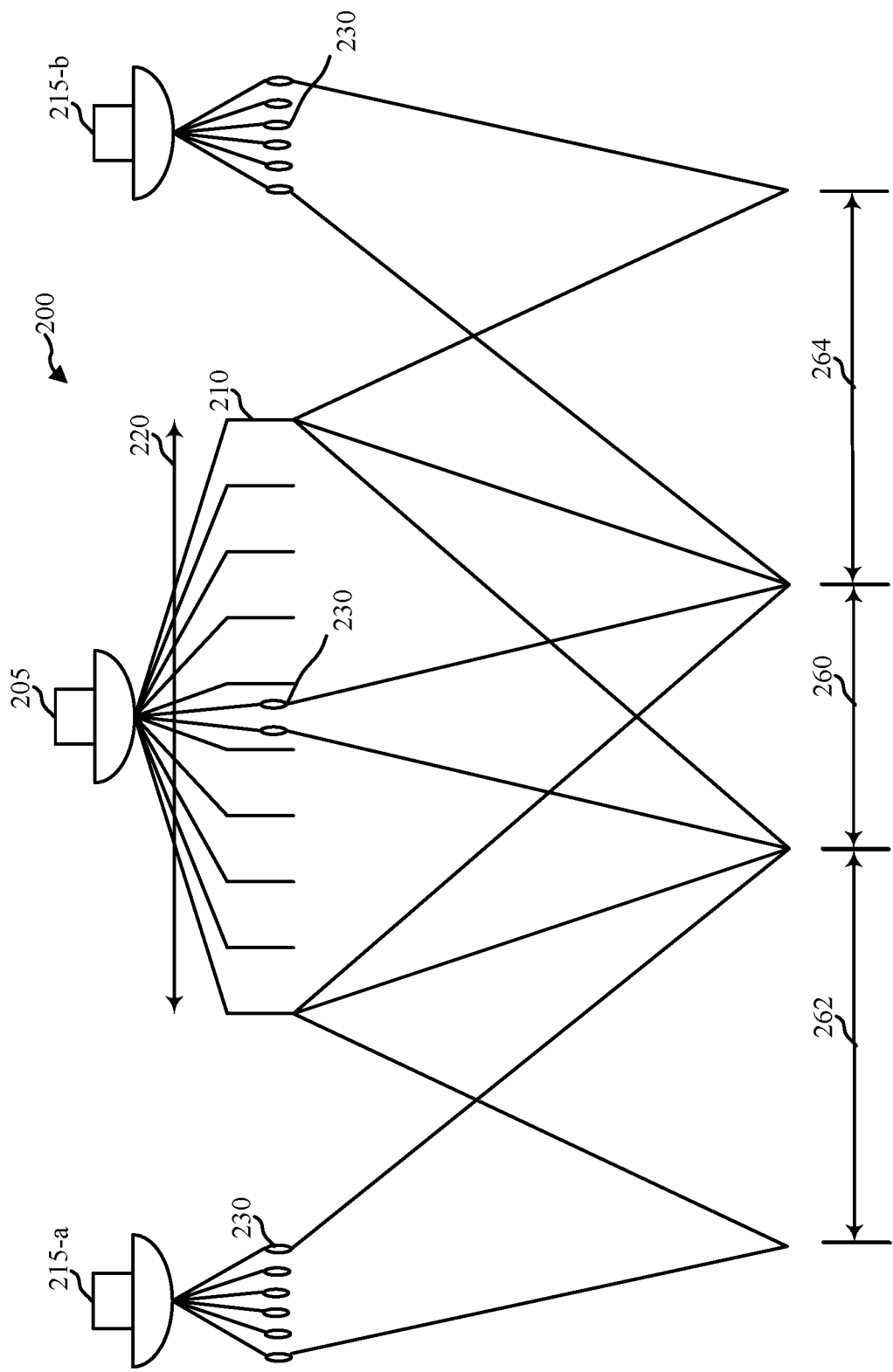
FIGS. 2A and 2B are simplified diagrams of a reconnaissance marine seismic survey system, in accordance with various embodiments.

FIG. 2A illustrates an example increased efficiency marine seismic acquisition system 200. System 200 includes an acquisition vessel 205 towing behind it streamers 210 and sources 230. As in system 100, the numbers of streamers 210 and sources 230 may vary from the numbers actually illustrated in FIG. 2A. The streamers 210 each include a plurality of receivers configured to receive seismic energy produced by the sources 230 and reflected off of interfaces in the regions below the swath 220 of streamers 210. Energy output by the sources 230 may be received by the streamers 210 so as to provide data for a conventional coverage area 260.

System 200 also includes at least one independent source vessel located to the side of the swath 220 of streamers 210. FIG. 2A illustrates two independent source vessels 215-a, 215-b. In some examples, only one independent source vessel 215 may be used. In either case, the independent source vessels 215 are located to the sides of the swath 220. The independent source vessels 215 may tow behind them a plurality of sources 230. The sources 230 may be electronically independent of each other, or may be communicatively coupled. The sources 230 towed by independent source vessel 215-a (to the left of the swath 220) may output energy that may be reflected off of a sinusoid coverage area or left side coverage area 262 that includes a portion of the region beneath the swath 220 not covered by the conventional coverage area 260. The left side coverage area 262 may extend beyond the region covered by the swath 220 such that the left side coverage area 262 includes both areas beneath the swath 220 and areas beyond and to the left side of the swath 220. Similarly, the sources 230 towed by independent source vessel 215-b (to the right of the swath 220) may output energy that may be reflected off of a sinusoid coverage area or right side coverage area 264 that includes a portion of the region beneath the swath 220 not covered by the conventional coverage area 260 or the left side coverage area 262. The right side coverage area 264 may extend beyond the region covered by the swath 220 such that the right side coverage area 264 includes both areas beneath the swath 220 and areas beyond and to the right side of the swath 220. The left side coverage area 262, the conventional coverage area 260, and the right side coverage area 264 may be substantially contiguous.

In FIG. 2A, the left side coverage area 262 and the right side coverage area 264 may each extend approximately 1155 meters. The widths of the left side coverage area 262 and the right side coverage area 264, however, may vary based on other factors, including the movement of the independent source vessels 215, as explained below, as well as the distances the independent source vessels 215 are from the swath 220. In the example of FIG. 2A, the independent source vessels 215 are each approximately 1290 meters from the edge of the swath 220. Independent source vessels 215 that are closer to the swath 220 may result in smaller side coverage areas 262, 264, though other factors, such as the spread of the sources 230, may influence the widths of the side coverage areas 262, 264. The distances included herein are merely examples; other distances may be used with similar effects. The offset distances between the independent source vessels 215 and the swath 220 may be selected so that the left side coverage area 262, the conventional coverage area 260, and the right side coverage area 264 are substantially contiguous.

Therefore, in system 200 of FIG. 2A, the total coverage area is the sum of the left side coverage area 262, the conventional coverage area 260, and the right side coverage area 264. Thus, the total coverage area may be, in this example, more than 3.5 times larger than that of the conventional coverage area 260.

In some embodiments, the independent source vessels 215 may zig-zag or undulate back and forth while still remaining to the sides of the swath 220. The independent source vessels 215 may follow different navigation paths, which may include sinusoidal movements, zig-zag patterns, square-wave patterns, or even random movements from side to side of a navigation region located to the side of the swath 220. In the example of FIG. 2A, the independent source vessels 215 may each undulate back and forth in a 600 meter spread. In other words, if the independent source vessels 215 were moving in a sinusoidal pattern, the amplitude of the sinusoidal pattern would be 600 meters. Other spreads may be used that are either greater or smaller. The spread and the undulating movement allows for sparse coverage of the side coverage areas 262, 264. While the coverage in the side coverage areas 262, 264 may be more sparse than in the conventional coverage area 260, the coverage may still be sufficient to generate a marine seismic survey for the combined coverage areas of the left side coverage area 262, the conventional coverage area 260, and the right side coverage area 264.

Figure 2B:
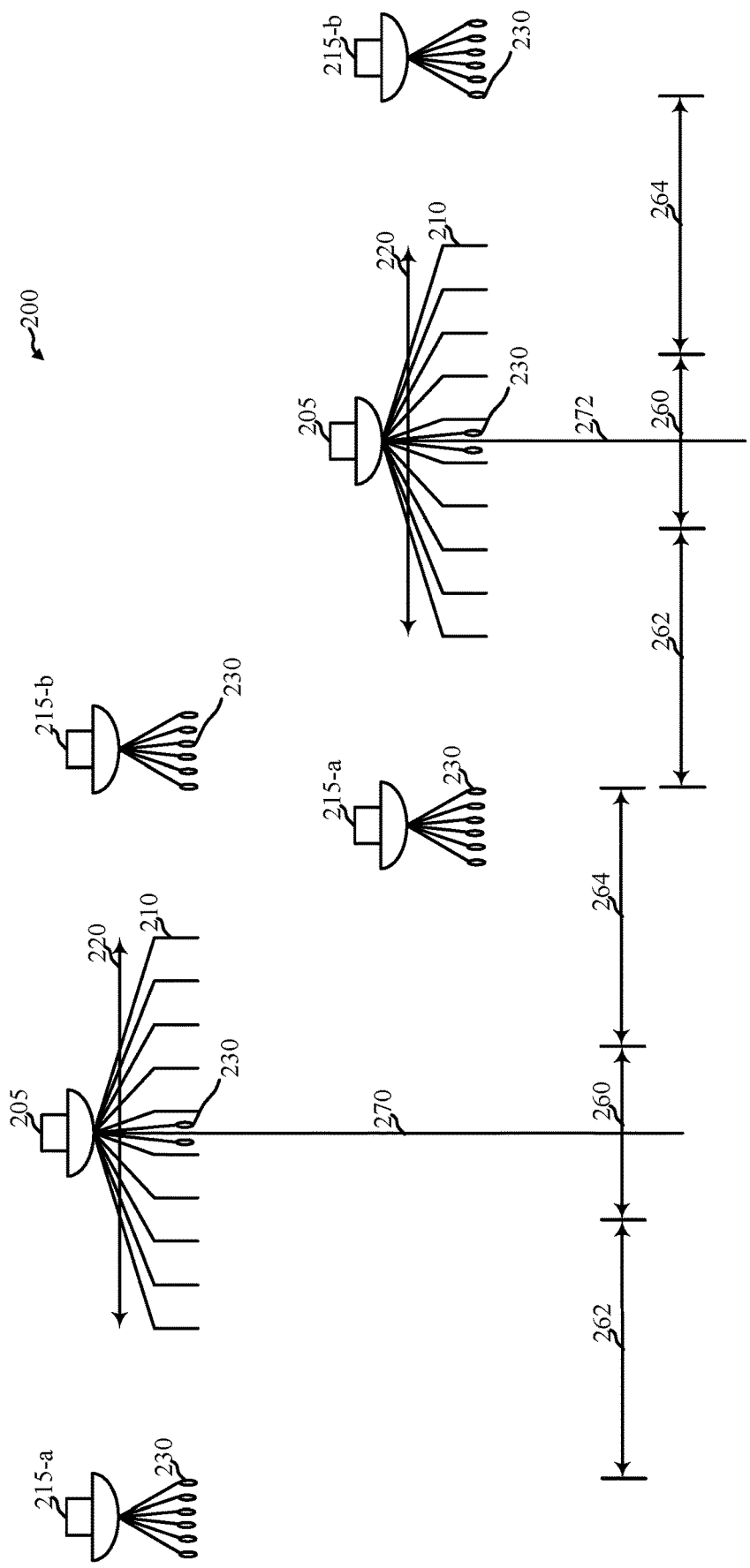

FIG. 2B illustrates an example of two sail lines 270, 272 with improved efficiency acquisition methods. The improved efficiency is manifest in a reduced density of the sail lines 270, 272. In FIG. 2B, the sail lines are farther apart than the sail lines in FIG. 1D because of the acquisition of data from side coverage areas 262, 264. Using the system 200 of FIG. 2A, the sail lines of FIG. 2B may be approximately 3200 meters apart. In FIG. 1D, the sail lines were approximately 900 meters apart. Thus, using the system 200 and the example values provided herein, the sail line density may be reduced by more than 3.5 times. Other degrees of density reduction may also be achieved by varying the swath 220 and the distance of the independent source vessels 215 from the swath 220. Using the principles described herein, the distance between the sail lines 270, 272 may be selected in conjunction with an offset distance between the independent source vessels 215 and the swath 220 such that the left side coverage areas 262, the conventional coverage areas 260, and the right side coverage areas 264 are substantially contiguous.

Thus, system 200 provides improved efficiencies in the acquisition and generation of marine seismic surveys. System 200 results in no overlap between swaths 220 of adjacent sail lines. Indeed, swaths 220 between adjacent sail lines may be separated by a predetermined distance. This means fewer sail lines may be needed to sufficiently survey a given area.

Figure 3A:
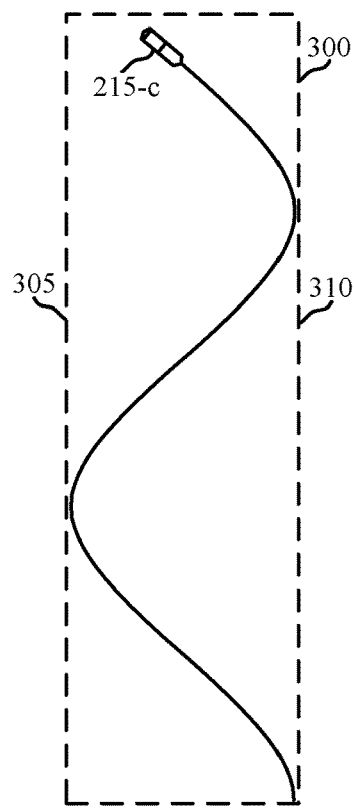
FIGS. 3A, 3B, 3C, and 3D are simplified diagrams of a reconnaissance marine seismic survey system, in accordance with various embodiments.
Figure 3B:
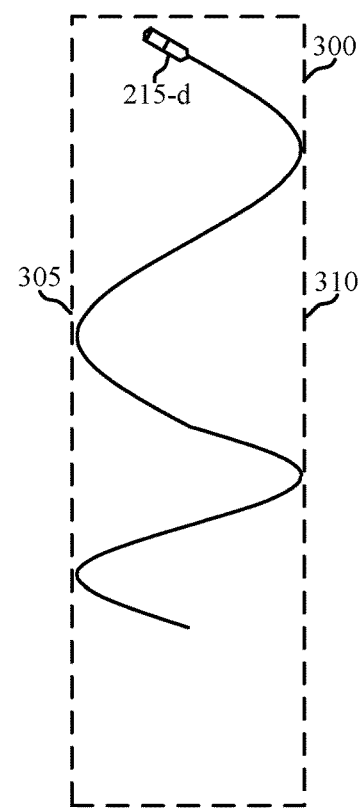

FIGS. 3A-3D illustrate variations of the movement of the independent source vessels 215 of FIGS. 2A and 2B. FIG. 3A illustrates a single independent source vessel 215-c, which may correspond to independent source vessel 215-a, 215-b of FIG. 2A or 2B. The independent source vessel 215-c of FIG. 3A may be towing one or more independent sources, and is illustrated as undulating between a left side 305 of a source navigation region 300 and a right side 310 of the source navigation region 300 in a substantially sinusoidal pattern. The independent source vessel 215-c advances in the same general direction as the acquisition vessel (not shown in FIG. 3A) as it undulates within the source navigation region 300. The navigation region 300 is located to the side of the swath 220 of FIGS. 2A and/or 2B. In FIG. 3B, a single independent source vessel 215-d is shown, but the "frequency" of the sinusoidal undulation is not kept constant, and instead varies to give a greater diversity of source-receiver pairs in the data recorded.

Figure 3C:
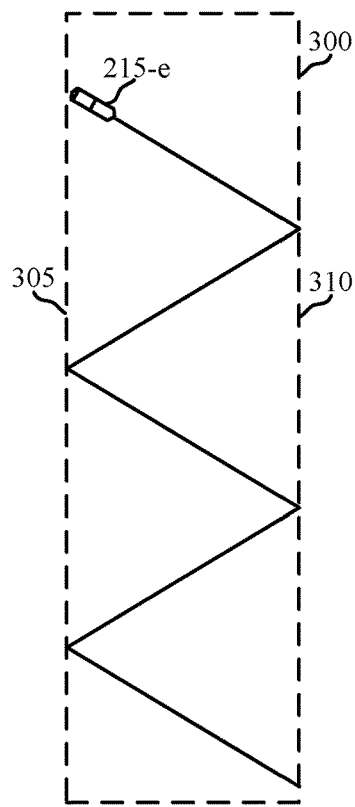
Figure 3D:
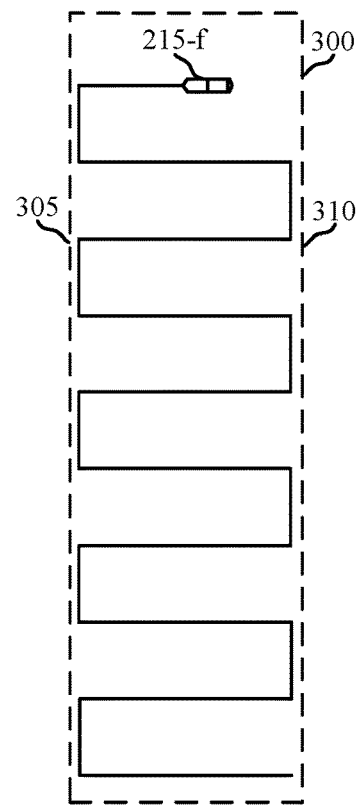

Referring now to FIGS. 3C and 3D, undulation patterns other than sinusoids are illustrated. In FIG. 3C, an independent source vessel 215-e undulates in a saw tooth pattern, and in FIG. 3D, a single independent source vessel 215-f undulates in a square wave pattern. It will thus be appreciated that the source vessels 215 need not undulate in a sinusoidal pattern, but generally can undulate in any given manner. Further, as illustrated in FIG. 3B, the undulation pattern need not remain constant, but can vary as the independent source vessel 215 advances in the same general direction as the acquisition vessel 205. In general, while FIGS. 3A-3D illustrate some examples of undulation patterns for one or more independent source vessels 215, it will be understood that there any many variations that are within the scope of the present disclosure. As one example of one such variation, consider that the pattern shown in FIG. 3B is generally a sinusoid with varying "frequency," but note that the "amplitude" of the undulation could also be varied (i.e., by having the independent source vessel 215 not traverse all the way to the edges of the source navigation region on some turns, but all the way or beyond the edges on other turns). Also, note that the paths shown in FIGS. 3A-3D may be idealized paths for the independent source vessels 215 to follow and that the actual paths followed may vary from those shown due to environmental factors (e.g., choppy water), navigational constraints (e.g., inaccuracies in navigation, a relatively large turn radius of the source vessels), and so forth.

Referring still to FIGS. 3A-3D, and also back to FIGS. 2A and 2B, the position of the independent source vessel(s) 215 relative to the acquisition vessel 205 will now be described. In some embodiments, the independent source vessel(s) 215 may undulate but remain close to the acquisition vessel 205 in order to maximize the offset range of data acquired from the receivers on the posterior end of the streamers. For example, an independent source vessel 215 may remain no less than 500 meters behind the acquisition vessel 205. In another example, the independent source vessel 215 may remain a distance following the acquisition vessel 205 that is approximately one-half the width of the swath 220 defined by the streamers 210. Additional examples may exist, as the independent source vessel 215 may be at any distance following the acquisition vessel 205.

In other embodiments, however, the independent source vessel(s) 215 may undulate and be operated near the posterior end of the streamers 210 (e.g., an independent source vessel 215 may be operated no more than 500 meters from the posterior end of the streamers 210 or, in other examples, at any distance from the posterior end of the streamers 210), which may again maximize the offset range of data acquired from the receivers of the steamers 210, except in this case the far offsets would be the receivers closest to the acquisition vessel.

Figure 4:
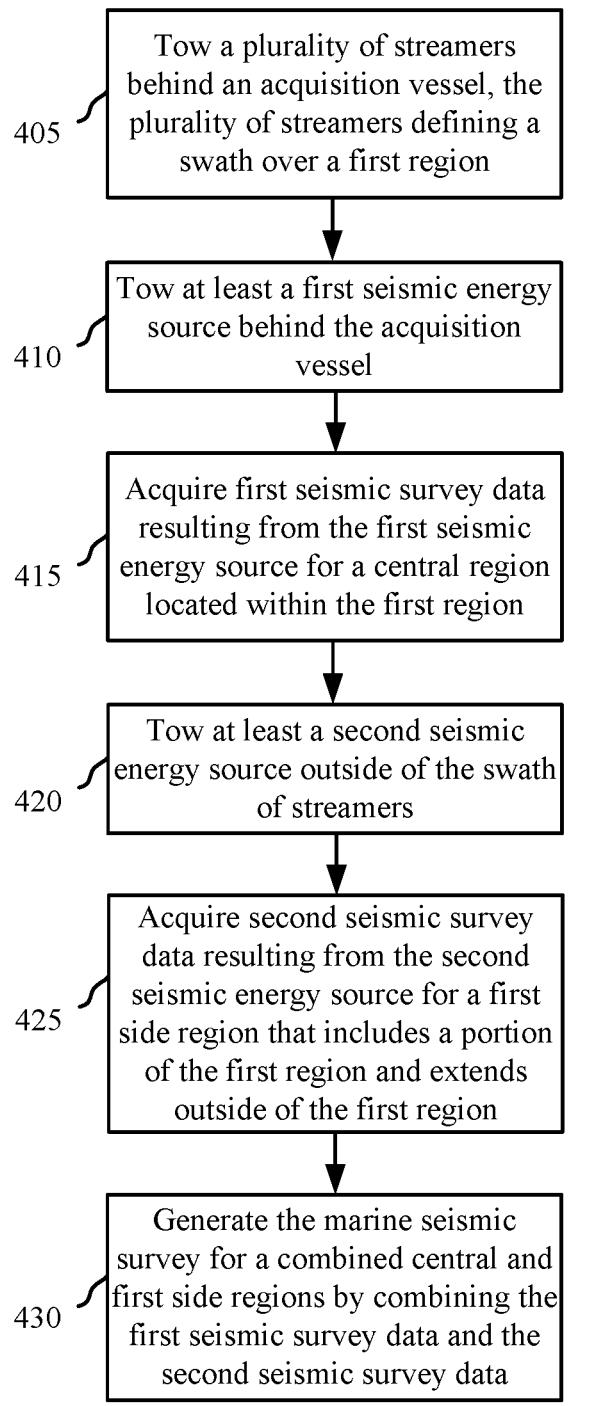
FIG. 4 is a flow chart illustrating a method of conducting a reconnaissance marine seismic survey, in accordance with various embodiments.

FIG. 4 is a flowchart illustrating a method 400 of acquiring a marine seismic survey using the system 200 shown in FIGS. 2A-3D, in accordance with some aspects of the present disclosure. At block 405, a plurality of streamers are towed behind an acquisition vessel. The plurality of streamers may define a swath over a first region. In some examples, the acquisition vessel may be acquisition vessel 205 of FIGS. 2A and 2B. In some examples, the streamers may be streamers 210 of FIGS. 2A and 2B. The defined swath may correspond to swath 220 of FIGS. 2A and 2B.

At block 410, at least a first seismic energy source may be towed behind the acquisition vessel. In some examples, the first seismic energy source may correspond to the sources 230 towed by the acquisition vessel 205 in FIGS. 2A and 2B.

At block 415, a first seismic survey data is acquired. The first seismic survey data may be the result of application of the first seismic energy source. The first seismic survey data may include data for a central region located with the first region. In some examples the central region may correspond to the conventional coverage area 260 of FIGS. 2A and 2B.

At block 420, at least a second seismic energy source is towed outside of the swath of streamers. In some examples, the second seismic energy source may correspond to the sources 230 towed by one of the independent source vessels 215 of FIGS. 2A and 2B.

At block 425, a second seismic survey data is acquired. The second seismic survey data may be result of application of the second seismic energy source. The second seismic survey data may include data for a first side region that may include a portion of the first region and may extend outside of the first region. In some examples, the first side region may correspond to one of the side regions 262, 264 of FIGS. 2A and 2B.

At block 430, a marine seismic survey may be generated. The marine seismic survey may be generated for a combined central and first side regions by combining the first seismic survey data and the second seismic survey data.

Figure 5:
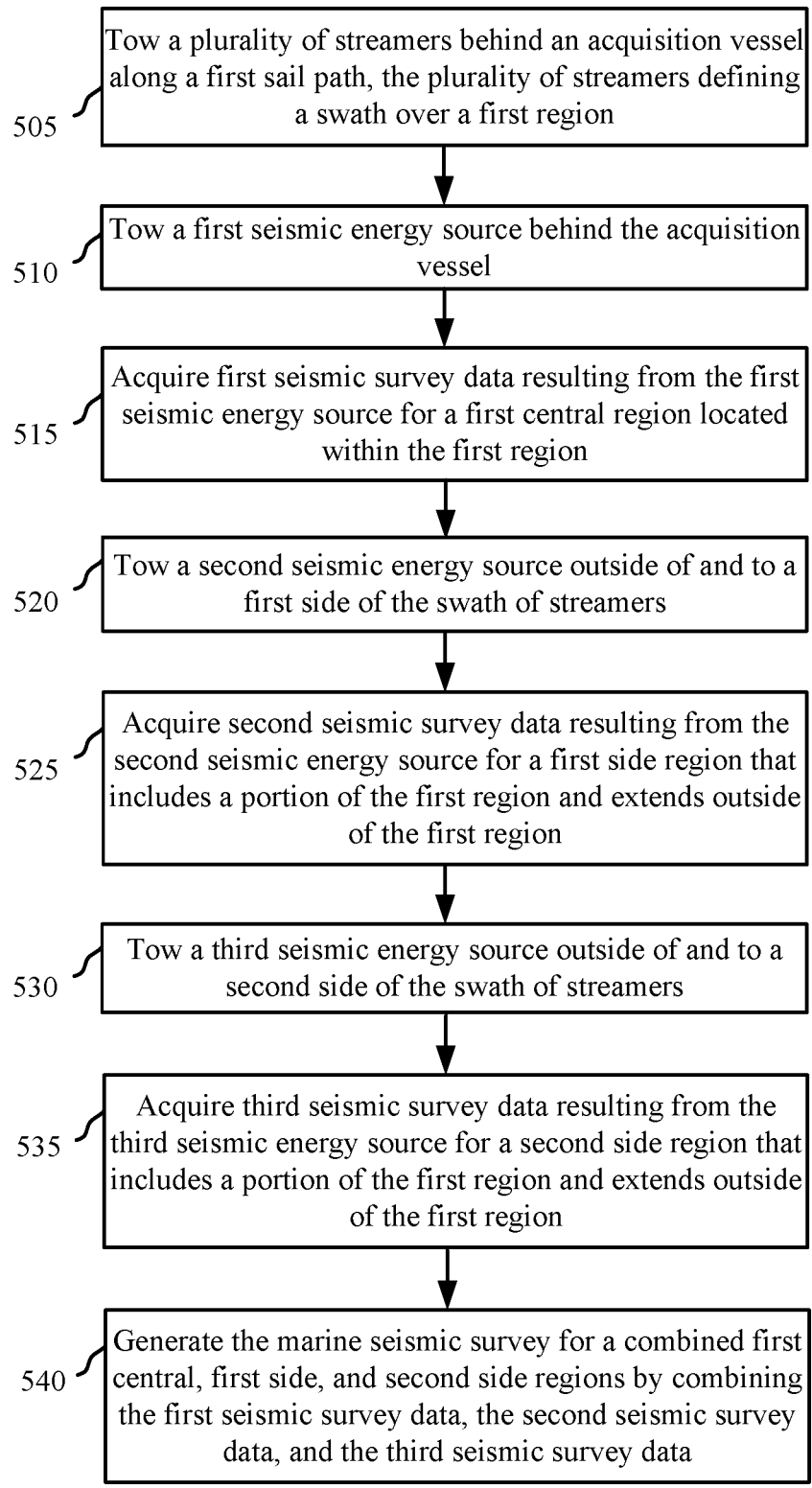
FIG. 5 is a flow chart illustrating a method of conducting a reconnaissance marine seismic survey, in accordance with various embodiments.

While method 400 indicates that data is obtained for only one side region (e.g., a first side region), data for two side regions may also be obtained, as illustrated in FIG. 5.

FIG. 5 is a flowchart illustrating a method 500 of acquiring a marine seismic survey using the system 200 shown in FIGS. 2A-3D, in accordance with some aspects of the present disclosure. At block 505, a plurality of streamers are towed behind an acquisition vessel along a sail line. The plurality of streamers may define a swath over a first region. In some examples, the acquisition vessel may be acquisition vessel 205 of FIGS. 2A and 2B. In some examples, the streamers may be streamers 210 of FIGS. 2A and 2B. The defined swath may correspond to swath 220 of FIGS. 2A and 2B. The sail line may correspond to sail line 270 of FIGS. 2A and 2B.

At block 510, at least a first seismic energy source may be towed behind the acquisition vessel. In some examples, the first seismic energy source may correspond to the sources 230 towed by the acquisition vessel 205 in FIGS. 2A and 2B.

At block 515, a first seismic survey data is acquired. The first seismic survey data may be the result of application of the first seismic energy source. The first seismic survey data may include data for a central region located with the first region. In some examples the central region may correspond to the conventional coverage area 260 of FIGS. 2A and 2B.

At block 520, a second seismic energy source is towed outside of and to a first side of the swath of streamers. In some examples, the second seismic energy source may correspond to the sources 230 towed by one of the independent source vessels 215 of FIGS. 2A and 2B. For example, the second seismic energy source may correspond to the sources 230 towed by independent source vessel 215-a.

At block 525, a second seismic survey data is acquired. The second seismic survey data may be result of application of the second seismic energy source. The second seismic survey data may include data for a first side region that may include a portion of the first region and may extend outside of the first region. In some examples, the first side region may correspond to the side region 262 of FIGS. 2A and 2B.

At block 530, a third seismic energy source is towed outside of and to a second side of the swath of streamers. In some examples, the third seismic energy source may correspond to the sources 230 towed by one of the independent source vessels 215 of FIGS. 2A and 2B. For example, the third seismic energy source may correspond to the sources 230 towed by independent source vessel 215-b.

At block 535, a third seismic survey data is acquired. The third seismic survey data may be result of application of the third seismic energy source. The third seismic survey data may include data for a second side region that may include a portion of the first region and may extend outside of the first region. In some examples, the second side region may correspond to the side region 264 of FIGS. 2A and 2B.

At block 540, a marine seismic survey may be generated. The marine seismic survey may be generated for a combined central, first side, and second side regions by combining the first seismic survey data, the second seismic survey data, and the third seismic data.

The methods 400, 500 described above, as well as the system 200 described herein, may be performed, in one example, as a result of code executed by a processor. In particular, the disclosure may include code stored in a non-transitory computer-readable medium. The code may be for acquiring a marine seismic survey. The code may include instructions executable to perform the methods 400, 500 or to implement the system 200 described herein. The code may be stored in hardware or firmware, for example, and may be executed using a processor specifically designed for this purpose. Alternatively, the code may be executed by a marine seismic survey acquisition computer, meaning a computer or collected hardware designed to acquire data in support of or generate a marine seismic survey.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of acquiring a marine seismic survey, comprising:

towing a plurality of streamers behind an acquisition vessel, the plurality of streamers defining a swath over a first region;

towing at least a first seismic energy source behind the acquisition vessel;

acquiring first seismic survey data resulting from the first seismic energy source for a central region located within the first region;

towing at least a second seismic energy source outside of the swath of streamers;

acquiring second seismic survey data resulting from the second seismic energy source for a first side region that includes a portion of the first region and extends outside of the first region, wherein the second seismic survey data is more sparse than the first seismic survey data based at least in part on the second seismic energy source being towed outside of the swath of streamers; and generating the marine seismic survey for a combined central and first side regions by combining the first seismic survey data and the second seismic survey data.

2. The method of claim 1, wherein towing at least the first seismic energy source comprises towing at least the first seismic energy source by the acquisition vessel.

3. The method of claim 1, wherein towing at least the second seismic energy source comprises towing at least the second seismic energy source by an independent source vessel.

4. The method of claim 1, wherein towing at least the second seismic energy source comprises:
towing the second seismic energy source by a first independent source vessel traveling outside of and to a first side of the swath of streamers; and
towing a third seismic energy source by a second independent source vessel traveling outside of and to a second side of the swath of streamers.

5. The method of claim 4, further comprising:
acquiring third seismic survey data resulting from the third seismic energy source for a second side region that includes a portion of the first region and extends outside of the first region; and
generating the marine seismic survey for a combined central, first side, and second side regions by combining the first seismic survey data, the second seismic survey data, and the third seismic survey data.

6. The method of claim 5, further comprising:
generating the marine seismic survey along a first sail line corresponding to the combined central, first side, and second side regions; and
extending the marine seismic survey along a second sail line corresponding to additional regions.

7. The method of claim 6, wherein the additional regions do not overlap the combined central, first side, and second side regions.

8. The method of claim 6, wherein the additional regions are adjacent to the combined central, first side, and second side regions.

9. The method of claim 6, wherein extending the marine seismic survey along a second sail line comprises:
towing the plurality of streamers behind the acquisition vessel along the second sail line over a second region such that the first region and the second region are separated by a predetermined distance.

10. The method of claim 1, wherein towing at least the second seismic energy source comprises:
towing at least the second seismic energy source in an undulating pattern outside of the swath of streamers.

11. The method of claim 1, wherein acquiring second seismic survey data for the first side region comprises acquiring a sparse data set for the first side region.

12. A method of acquiring a marine seismic survey, comprising:
towing a plurality of streamers behind an acquisition vessel along a first sail line, the plurality of streamers defining a swath over a first region;
towing a first seismic energy source behind the acquisition vessel;
acquiring first seismic survey data resulting from the first seismic energy source for a first central region located within the first region;
towing a second seismic energy source outside of and to a first side of the swath of streamers;
acquiring second seismic survey data resulting from the second seismic energy source for a first side region that includes a portion of the first region and extends outside of the first region, wherein the second seismic survey data is more sparse than the first seismic survey data based at least in part on the second seismic energy source being towed outside of the swath of streamers;
towing a third seismic energy source outside of and to a second side of the swath of streamers;
acquiring third seismic survey data resulting from the third seismic energy source for a second side region that includes a portion of the first region and extends outside of the first region, wherein the third seismic survey data is more sparse than the first seismic survey data based at least in part on the third seismic energy source being towed outside of the swath of streamers; and
generating the marine seismic survey for a combined first central, first side, and second side regions by combining the first seismic survey data, the second seismic survey data, and the third seismic survey data.

13. The method of claim 12, further comprising:
towing the plurality of streamers along a second sail line over a second region;
acquiring fourth seismic survey data resulting from the first seismic energy source for a second central region located within the second region;
acquiring fifth seismic survey data resulting from the second seismic energy source for a third side region that includes a portion of the second region and extends outside of the second region;
acquiring sixth seismic survey data resulting from the third seismic energy source for a fourth side region that includes a portion of the second region and extends outside of the second region in a direction opposite that of the third side region; and
generating the marine seismic survey for a combined first central, second central, first side, second side, third side, and fourth side regions by combining the first seismic survey data, the second seismic survey data, the third seismic survey data, the fourth seismic survey data, the fifth seismic survey data, and the sixth seismic survey data.

14. The method of claim 13, wherein the first region and the second region are separated by a predetermined distance.

15. A non-transitory computer-readable medium storing code for acquiring a marine seismic survey, the code comprising instructions executable to:
tow a plurality of streamers behind an acquisition vessel, the plurality of streamers defining a swath over a first region;
tow at least a first seismic energy source behind the acquisition vessel;
acquire first seismic survey data resulting from the first seismic energy source for a central region located within the first region;
tow at least a second seismic energy source outside of the swath of streamers;
acquire second seismic survey data resulting from the second seismic energy source for a first side region that includes a portion of the first region and extends outside of the first region, wherein the second seismic survey data is more sparse than the first seismic survey data based at least in part on the second seismic energy source being towed outside of the swath of streamers; and
generate the marine seismic survey for a combined central and first side regions by combining the first seismic survey data and the second seismic survey data.

16. The non-transitory computer-readable medium of claim 15, wherein the instructions executable to tow at least the first seismic energy source comprise instructions executable to tow at least the first seismic energy source by the acquisition vessel.

17. The non-transitory computer-readable medium of claim 15, wherein the instructions executable to tow at least the second seismic energy source comprise instructions executable to tow at least the second seismic energy source by an independent source vessel.

18. The non-transitory computer-readable medium of claim 15, wherein the instructions executable to tow at least the second seismic energy source comprise instructions executable to:
tow the second seismic energy source by a first independent source vessel traveling outside of and to a first side of the swath of streamers; and
tow a third seismic energy source by a second independent source vessel traveling outside of and to a second side of the swath of streamers.

19. The non-transitory computer-readable medium of claim 18, further comprising instructions executable to:
acquire third seismic survey data resulting from the third seismic energy source for a second side region that includes a portion of the first region and extends outside of the first region; and
generate the marine seismic survey for a combined central, first side, and second side regions by combining the first seismic survey data, the second seismic survey data, and the third seismic survey data.

20. The non-transitory computer-readable medium of claim 19, further comprising instructions executable to:
generate the marine seismic survey along a first sail line corresponding to the combined central, first side, and second side regions; and
extend the marine seismic survey along a second sail line corresponding to additional regions.

21. The non-transitory computer-readable medium of claim 20, wherein the additional regions do not overlap the combined central, first side, and second side regions.

22. The non-transitory computer-readable medium of claim 20, wherein the additional regions are adjacent to the combined central, first side, and second side regions.

23. The non-transitory computer-readable medium of claim 20, wherein the instructions executable to extend the marine seismic survey along a second sail line comprise instructions executable to:
tow the plurality of streamers behind the acquisition vessel along the second sail line over a second region such that the first region and the second region are separated by a predetermined distance.

24. The non-transitory computer-readable medium of claim 15, wherein the instructions executable to tow at least the second seismic energy source comprise instructions executable to:
tow at least the second seismic energy source in an undulating pattern outside of the swath of streamers.

25. The non-transitory computer-readable medium of claim 15, wherein the instructions executable to acquire second seismic survey data for the first side region comprise instructions executable to acquire a sparse data set for the first side region.

* * * * *